US008769656B2

(12) United States Patent
Corda et al.

(10) Patent No.: US 8,769,656 B2
(45) Date of Patent: *Jul. 1, 2014

(54) METHOD AND TRUSTED SERVICE MANAGER FOR PROVIDING FAST AND SECURE ACCESS TO APPLICATIONS ON AN IC CARD

(75) Inventors: Alexandre Corda, Nice (FR); Ismaila Wane, Tucson, AZ (US); Vincent Lemonnier, Nice (FR)

(73) Assignee: NXP B.V., Eindhoven (NL)

( * ) Notice: Subject to any disclaimer, the term of this patent is extended or adjusted under 35 U.S.C. 154(b) by 643 days.

This patent is subject to a terminal disclaimer.

(21) Appl. No.: 12/995,156

(22) PCT Filed: May 14, 2009

(86) PCT No.: PCT/IB2009/052008
§ 371 (c)(1),
(2), (4) Date: Apr. 20, 2011

(87) PCT Pub. No.: WO2009/144612
PCT Pub. Date: Dec. 3, 2009

(65) Prior Publication Data
US 2011/0191841 A1 Aug. 4, 2011

(30) Foreign Application Priority Data

May 29, 2008 (EP) .................................. 08290497

(51) Int. Cl.
*G06F 21/00* (2013.01)
*G06F 12/14* (2006.01)
*H04L 29/06* (2006.01)
*G06F 21/79* (2013.01)
*G06F 21/71* (2013.01)

(52) U.S. Cl.
CPC ............ *G06F 12/1483* (2013.01); *H04L 63/10* (2013.01); *G06F 21/79* (2013.01); *G06F 21/71* (2013.01); *H04L 63/0492* (2013.01)
USPC ........ 726/9; 705/65; 705/66; 705/67; 705/68; 705/69; 713/172; 713/173; 713/174

(58) Field of Classification Search
CPC ..... G06F 12/1483; G06F 21/79; G06F 21/71; H04L 63/10; H04L 63/0492
USPC .............. 726/1–21; 705/65–69; 713/172–174
See application file for complete search history.

(56) References Cited

U.S. PATENT DOCUMENTS 6,986,458 B2 * 1/2006 Flugge et al. .................. 235/375
7,865,141 B2 * 1/2011 Liao et al. ..................... 455/41.2
(Continued)

FOREIGN PATENT DOCUMENTS

| EP | 1248188 A1 | 10/2002 |
| EP | 1770533 A1 | 4/2007 |
| WO | 2006/092504 A1 | 9/2006 |

OTHER PUBLICATIONS

Leone, Manuel, WO 2008/014800 A1, Feb. 7, 2008, pp. 1-42.*

(Continued)

*Primary Examiner* — Haresh N Patel

(57) ABSTRACT

A method for providing fast and secure access to MIFARE applications installed in a MIFARE memory being configured as a MIFARE Classic card or an emulated MIFARE Classic memory, comprises: keeping a repository of MIFARE memories and user identifications assigned to said MIFARE memories as well as of all MIFARE applications installed in the MIFARE memories, wherein, when a new MIFARE application is to be installed in a MIFARE memory identified by a user identification the present memory allocation of said MIFARE memory is retrieved, an appropriate sector of said MIFARE memory is calculated, a key is calculated for said MIFARE application and the MIFARE application together with the assigned sector and key are linked to the user identification and are stored in the repository.

8 Claims, 4 Drawing Sheets

(56) References Cited

U.S. PATENT DOCUMENTS

| | | | | |
|---|---|---|---|---|
| 7,967,215 | B2* | 6/2011 | Kumar et al. | 235/492 |
| 8,116,678 | B2* | 2/2012 | Johnson et al. | 455/41.1 |
| 8,118,218 | B2* | 2/2012 | Koh et al. | 235/380 |
| 8,391,837 | B2* | 3/2013 | Corda | 455/410 |
| 2002/0089890 | A1 | 7/2002 | Fibranz | |
| 2005/0079863 | A1* | 4/2005 | Macaluso | 455/419 |
| 2005/0138148 | A1 | 6/2005 | Ronen et al. | |
| 2007/0293155 | A1* | 12/2007 | Liao et al. | 455/41.2 |
| 2008/0073426 | A1* | 3/2008 | Koh et al. | 235/380 |
| 2008/0306849 | A1* | 12/2008 | Johnson et al. | 705/35 |
| 2009/0003577 | A1* | 1/2009 | Chin et al. | 379/207.13 |
| 2009/0023476 | A1* | 1/2009 | Saarisalo et al. | 455/561 |
| 2009/0103124 | A1* | 4/2009 | Kimura et al. | 358/1.15 |
| 2009/0199206 | A1* | 8/2009 | Finkenzeller et al. | 719/313 |
| 2009/0261172 | A1* | 10/2009 | Kumar et al. | 235/492 |
| 2010/0027798 | A1* | 2/2010 | Back | 380/279 |
| 2010/0093396 | A1* | 4/2010 | Roundtree | 455/558 |

OTHER PUBLICATIONS

Finkenzeller et al., WO 2007/144149 A2, Dec. 21, 2007, pp. 1-42.*
GSM Association; "Pay-Buy-Mobile Business Opportunity Analysis"; Public White Paper, Version 1.0; 36 Pages; URL://http://www.gsmworld.com/documents/gsma_nfc_tech_guide_vs1.pdf (Nov. 1, 2007).
Anonymous: "MIFARE Standard Card IC MF1 IC S50 Functional Specification" Philips Semiconductors Product Specification Revision 4.0; 18 Pages (Jul. 1, 1998).
International Search Report for Application PCT/IB2009/052008 (May 14, 2009).
Anonymous: "Mobile NFC Technical Guidelines, version 2.0"; Internet citation URL: http://www.gsmworld.com/documents/nfc/gsma_nfc2_wp.pdf: 34 pages; 2007.
GSMA; "Mobile NFC Services"; URL:http://www.gsmworld.com/documents/nfc_services_0207.pdf; pp. 1-24; Feb. 1, 2007.

* cited by examiner

| Sector | Block | Byte Number within a Block | | | | | | | | | | | | | | | | Description |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | |
| 15 | 3 | Key A | | | | | | Access Bits | | | | Key B | | | | | | Sector Trailer 15 |
| | 2 | | | | | | | | | | | | | | | | | Data |
| | 1 | | | | | | | | | | | | | | | | | Data |
| | 0 | | | | | | | | | | | | | | | | | Data |
| 14 | 3 | Key A | | | | | | Access Bits | | | | Key B | | | | | | Sector Trailer 14 |
| | 2 | | | | | | | | | | | | | | | | | Data |
| | 1 | | | | | | | | | | | | | | | | | Data |
| | 0 | | | | | | | | | | | | | | | | | Data |
| ⋮ | ⋮ | | | | | | | | | | | | | | | | | |
| 1 | 3 | Key A | | | | | | Access Bits | | | | Key B | | | | | | Sector Trailer 1 |
| | 2 | | | | | | | | | | | | | | | | | Data |
| | 1 | | | | | | | | | | | | | | | | | Data |
| | 0 | | | | | | | | | | | | | | | | | Data |
| 0 | 3 | Key A | | | | | | Access Bits | | | | Key B | | | | | | Sector Trailer 0 |
| | 2 | | | | | | | | | | | | | | | | | Data |
| | 1 | | | | | | | | | | | | | | | | | Data |
| | 0 | | | | | | | | | | | | | | | | | Manufacturer Block |
Fig. 1
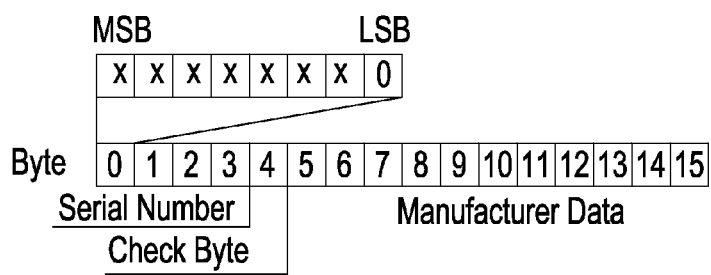
Fig. 2
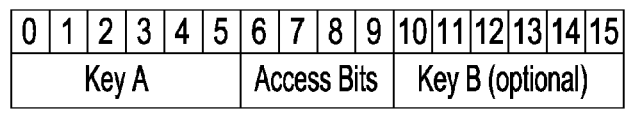
Fig. 3

METHOD AND TRUSTED SERVICE MANAGER FOR PROVIDING FAST AND SECURE ACCESS TO APPLICATIONS ON AN IC CARD

FIELD OF THE INVENTION

The invention relates to a method for providing fast and secure access to MIFARE applications installed in a MIFARE memory.

The invention further relates to a trusted service manager.

BACKGROUND OF THE INVENTION

The MIFARE® classic family, developed by NXP Semiconductors is the pioneer and front runner in contactless smart card ICs operating in the 13.56 MHz frequency range with read/write capability. MIFARE® is a trademark of NXP Semiconductors. MIFARE complies with ISO14443 A, which is used in more than 80% of all contactless smart cards today. The technology is embodied in both cards and card reader devices. MIFARE cards are being used in an increasingly broad range of applications (including transport ticketing, access control, e-payment, road tolling, and loyalty applications). MIFARE Standard (or Classic) cards employ a proprietary high-level protocol with a proprietary security protocol for authentication and ciphering. MIFARE® technology has become a standard for memory devices with key-protected memory sectors. One example for a published product specification of MIFARE® technology is the data sheet "MIFARE® Standard Card IC MF1 IC S50—Functional Specification" (1998) which is herein incorporated by reference. MIFARE® technology is also discussed in: Klaus Finkenzeller, "RFID Handbuch", HANSER, 4$^{th}$ edition (2006).

The MIFARE Classic cards are fundamentally just memory storage devices, where the memory is divided into sectors and blocks with simple security mechanisms for access control. Each device has a unique serial number. Anticollision is provided so that several cards in the field may be selected and operated in sequence.

The MIFARE Standard 1 k offers about 768 bytes of data storage, split into 16 sectors with 4 blocks of 16 bytes each (one block consists of 16 bytes); each sector is protected by two different keys, called A and B. They can be programmed for operations like reading, writing, increasing value blocks, etc. The last block of each sector is called "trailer", which contains two secret keys (A and B) and programmable access conditions for each block in this sector. In order to support multi-application with key hierarchy, an individual set of two keys (A and B) per sector (per application) is provided.

The memory organization of a MIFARE Standard 1 k card is shown in FIG. 1. The 1024×8 bit EEPROM memory is organized in 16 sectors with 4 blocks of 16 bytes each. The first data block (block 0) of the first sector (sector 0) is the manufacturer block which is shown in detail in FIG. 2. It contains the serial number of the MIFARE card that has a length of four bytes (bytes 0 to 3), a check byte (byte 4) and eleven bytes of IC manufacturer data (bytes 5 to 15). The serial number is sometimes called MIFARE User IDentification (MUID) and is a unique number. Due to security and system requirements the manufacturer block is write protected after having been programmed by the IC manufacturer at production. However, the MIFARE specification allows to change the serial number during operation of the MIFARE card, which is particularly useful for MIFARE emulation cards like SmartMX cards.

SmartMX (Memory eXtension) is a family of smart cards that have been designed by NXP Semiconductors for high-security smart card applications requiring highly reliable solutions, with or without multiple interface options. Key applications are e-government, banking/finance, mobile communications and advanced public transportation.

The ability to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security. SmartMX incorporates a range of security features to counter measure side channel attacks like DPA, SPA etc. A true anticollision method (acc. ISO/IEC 14443-3), enables multiple cards to be handled simultaneously.

It should be noted that the emulation of MIFARE Classic cards is not only restricted to SmartMX cards, but there may also exist other present or future smartcards being able to emulate MIFARE Classic cards.

Recently, mobile communication devices have been developed which contain MIFARE devices, either being configured as MIFARE Classic cards or as MIFARE emulation devices like SmartMX cards. These mobile communication devices comprise e.g. mobile phones with Near Field Communication (NFC) capabilities, but are not limited to mobile phones.

MIFARE as a card or in a mobile communication device (SmartMX for example) can be used for multi-applications purposes. I.e. it is possible to install several tickets, coupons, access controls and so on in one MIFARE memory.

However, this multi-applications feature causes problems with increased access times, since a reader device has to parse all the content of the MIFARE memory in order to reliably find the correct application and necessary information. But fast access is urgently needed for instance at stadium gates, transit areas and so on.

Another issue of the multi-applications feature is its potentially insufficient protection of privacy and insufficient security, since, if a reader is able to parse all the MIFARE memory to retrieve data this reader is also able to access other information than the one actually needed, and may violate the user's privacy by gathering information that was not meant for it.

OBJECT AND SUMMARY OF THE INVENTION

It is an object of the invention to provide a method of the type defined in the opening paragraph and a trusted service manager of the type defined in the second paragraph, in which the disadvantages defined above are avoided.

In order to achieve the object defined above, with a method according to the invention characteristic features are provided so that a method according to the invention can be characterized in the way defined below, that is:

A method for providing fast and secure access to MIFARE applications installed in a MIFARE memory being configured as a MIFARE Classic card or an emulated MIFARE Classic memory, wherein the method comprises keeping a repository of MIFARE memories and user identifications assigned to said MIFARE memories as well as of all MIFARE applications installed in the MIFARE memories, wherein, when a new MIFARE application is to be installed in a MIFARE memory identified by a user identification the present memory allocation of said MIFARE memory is retrieved, an appropriate sector of said MIFARE memory is calculated, a key is calculated for said MIFARE application and the MIFARE application together with the assigned sector and key are linked to the user identification and are stored in the repository.

In order to achieve the object defined above, with a trusted service manager according to the invention characteristic features are provided so that it can be characterized in the way defined below, that is:

A trusted service manager keeping a repository of MIFARE memories and user identifications assigned to said MIFARE memories as well as of all MIFARE applications installed in the MIFARE memories, wherein, when a new MIFARE application is to be installed in a MIFARE memory identified by a user identification the trusted service manager retrieves the present memory allocation of said MIFARE memory from the repository, calculates an appropriate sector of said MIFARE memory, calculates a key for said MIFARE application, links the MIFARE application together with the assigned sector number and key to the user identification and stores them all in the repository.

The characteristic features according to the invention provide the advantage that they provide fastest access to retrieve MIFARE applications from MIFARE memories. Another advantage of the invention is that it overcomes security issues of prior art solutions and that it does not violate the user's privacy by gathering information without permission.

In one aspect of the present invention additional security is provided in that when an RFID reader requests to get the sector and key for a particular MIFARE application the requested information is retrieved from the repository and transmitted to the RFID reader only if the request is made within a defined time frame.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

FIG. 1 shows the memory organization of a MIFARE Standard 1 k EEPROM.

FIG. 2 shows the manufacturer block of a MIFARE memory.

FIG. 3 shows the sector trailer of a sector of MIFARE memory.

DESCRIPTION OF EMBODIMENTS

Figure 4:
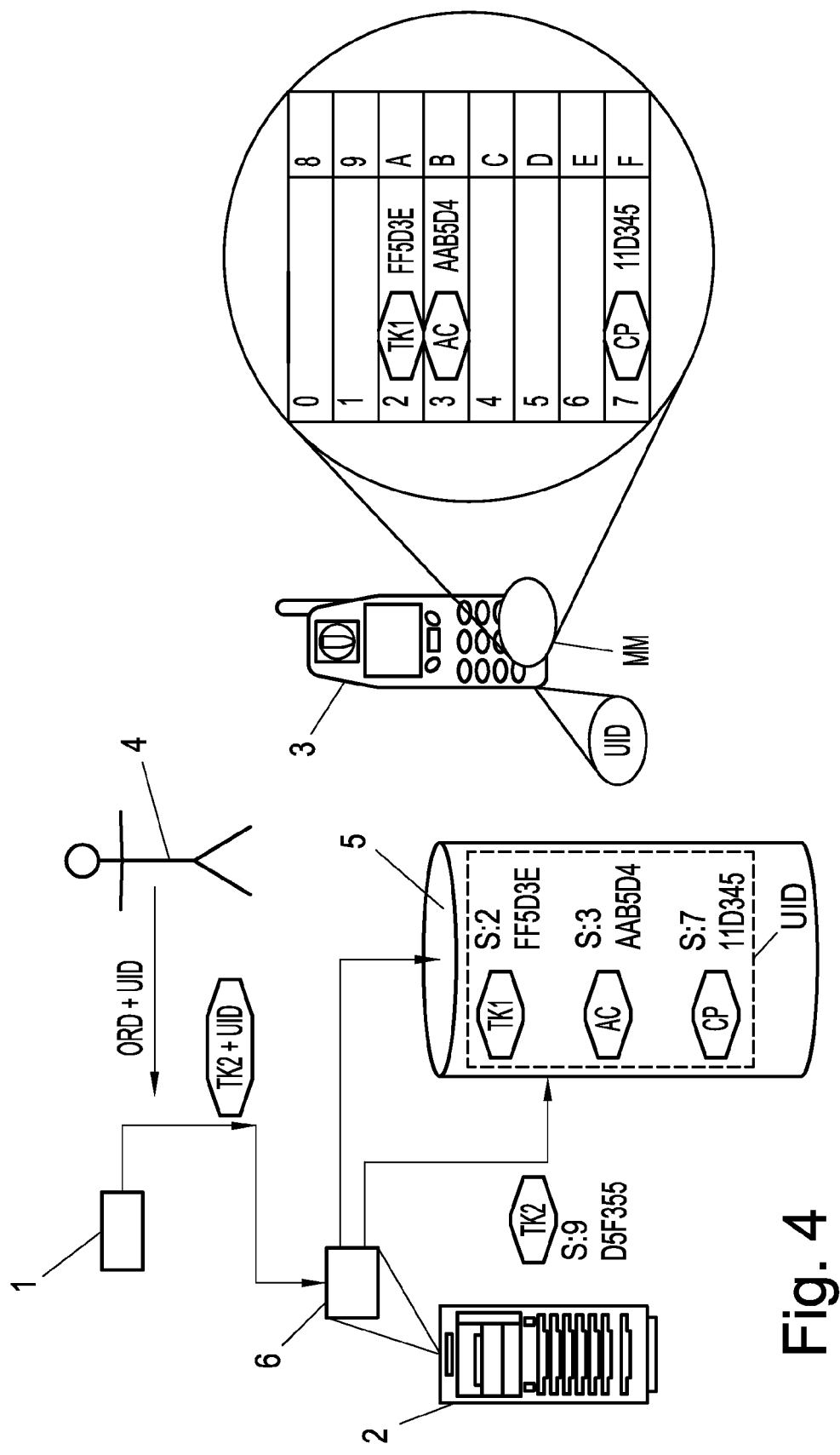
FIG. 4 shows a schematic diagram of a telecommunication system according to the present invention.

FIG. 4 shows a schematic diagram of a telecommunication system according to the present invention. The system comprises a service provider 1, a trusted service manager 2 and a mobile communication device 3. It should be observed that the numbers of service providers 1, trusted service managers 2 and mobile communication devices 3 are in no way limited. A user 4 of the mobile communication device 3 communicates with the service provider 1 either by directly using his mobile communication device which establishes a communication channel to the service provider 1 via Over-the-Air (OTA) services provided by a mobile network operator, particularly via Short Message Service (SMS) services, or via a computer network (HTTP, HTTPS . . . ) or wireless services. Similarly, the trusted service manager 2 communicates with the mobile communication device 3 via an Over-The-Air service of a mobile network operator, e.g. Short Message Service, HTTP, HTTPS . . . . The service provider 1 communicates with the trusted service manager 2 via a computer network, such as the Internet, wherein the preferred data transmission protocol is HTTPS.

The mobile communication device 3 may e.g. be configured as a NFC mobile phone. The mobile communication device 3 comprises a processor (not shown in the drawings) for executing software being internally stored in the mobile communication device 3. Said software comprises an operating system for carrying out and managing all functions of the mobile communication device 3. The mobile communication device 3 also comprises an internal memory being controlled by the operating system of the device. The mobile communication device 3 further comprises a MIFARE memory MM which is either configured as a MIFARE Classic card (e.g. 1K card) or as an emulated MIFARE Classic memory that forms part of a secure element, which is a memory device with enhanced security features that comprises its own computational power. Such a secure element is advantageously configured as a SmartMX device. For the present invention it does not matter whether the MIFARE memory MM is a classic card or an emulated card.

The mobile communication device 3 further comprises a MIFARE application manager MAM which is a software module forming part of the general software of the mobile communication device 3. The MIFARE application manager MAM has the ability to install MIFARE applications in the MIFARE memory MM, to read MIFARE applications from the MIFARE memory MM and to de-install MIFARE applications from the MIFARE memory MM. MIFARE applications are for instance tickets, coupons, access controls, e-purse functions, etc. Since the MIFARE application manager MAM is not part of the invention but is a prior art software module, a detailed description may be omitted.

When a user 4 wants to order (arrow ORD) a MIFARE application from the service provider 1 he accesses a user interface run by the service provider 1. User interfaces may be configured as Internet websites or as graphical or textual interfaces to be used with the mobile communication device 3. The user selects the MIFARE application TK2, in this example a ticket, and additionally transmits a user identification UID to the service provider 1. The user identification UID allows identifying the MIFARE memory MM where the ordered MIFARE application TK2 has to be installed. If the MIFARE memory MM is arranged within the target communication device 3, an appropriate user identification UID is e.g. the telephone number of said mobile communication device 3. Modern NFC telephones often come with built-in MIFARE memories MM. Therefore, using the telephone number of such telephones to identify the built-in MIFARE memory MM is the best choice.

Next, the service provider 1 sends a request REQ for installing the MIFARE application TK2 to the trusted service manager 2. This request REQ contains the MIFARE application TK2 and the user identification UID.

The trusted service manager 2 keeps a repository 5 of all MIFARE memories MM for whom it is in charge of and their associated user identifications UID. Since in general applications the MIFARE memories MM are installed in mobile communication devices 3 one could also say that the trusted service manager 2 keeps a repository 5 of mobile communication devices 3 linked with MIFARE memories MM. Anyway, due to this repository 5 the trusted service manager 2 always has the knowledge which MIFARE applications are installed in the MIFARE memories MM. In the present example the MIFARE memory MM installed in the mobile communication device 3 contains a first ticket application TK1 in sector no. 2, an access control application AC in sector no. 3 and a coupon application CP in sector no. 7 of the MIFARE memory MM. The remaining sectors of the MIFARE memory MM are empty. As has been explained above, keys K are needed for accessing MIFARE applications. The key K assigned to the first ticket application TK1 has the exemplary value FF5D3E. The key K assigned to the access control application AC has the exemplary value AAB5D4. The key K assigned to the coupon application CP has the exemplary value 11D345.

The trusted service manager 2 comprises a MIFARE storage optimizer 6 which is implemented by software. The MIFARE storage optimizer 6 receives the request REQ from the service provider 1 together with the MIFARE application TK2 to be installed and the user identification UID. By using the user identification UID the MIFARE storage optimizer 6 retrieves the present memory allocation of the MIFARE memory MM of the mobile communication device 3 that has the user identification UID and calculates an appropriate sector for the MIFARE application TK2. It further calculates a key K, e.g. having an exemplary value D5F355, assigns this key K to the MIFARE application TK2 and stores all together in the repository 5. It should be mentioned that the repository 5 is controlled by one or a plurality of trusted service managers. Alternatively, a plurality of trusted service managers is provided each of them having their own repositories for controlling a subset of mobile communication devices and their associated MIFARE memories.

Figure 5:
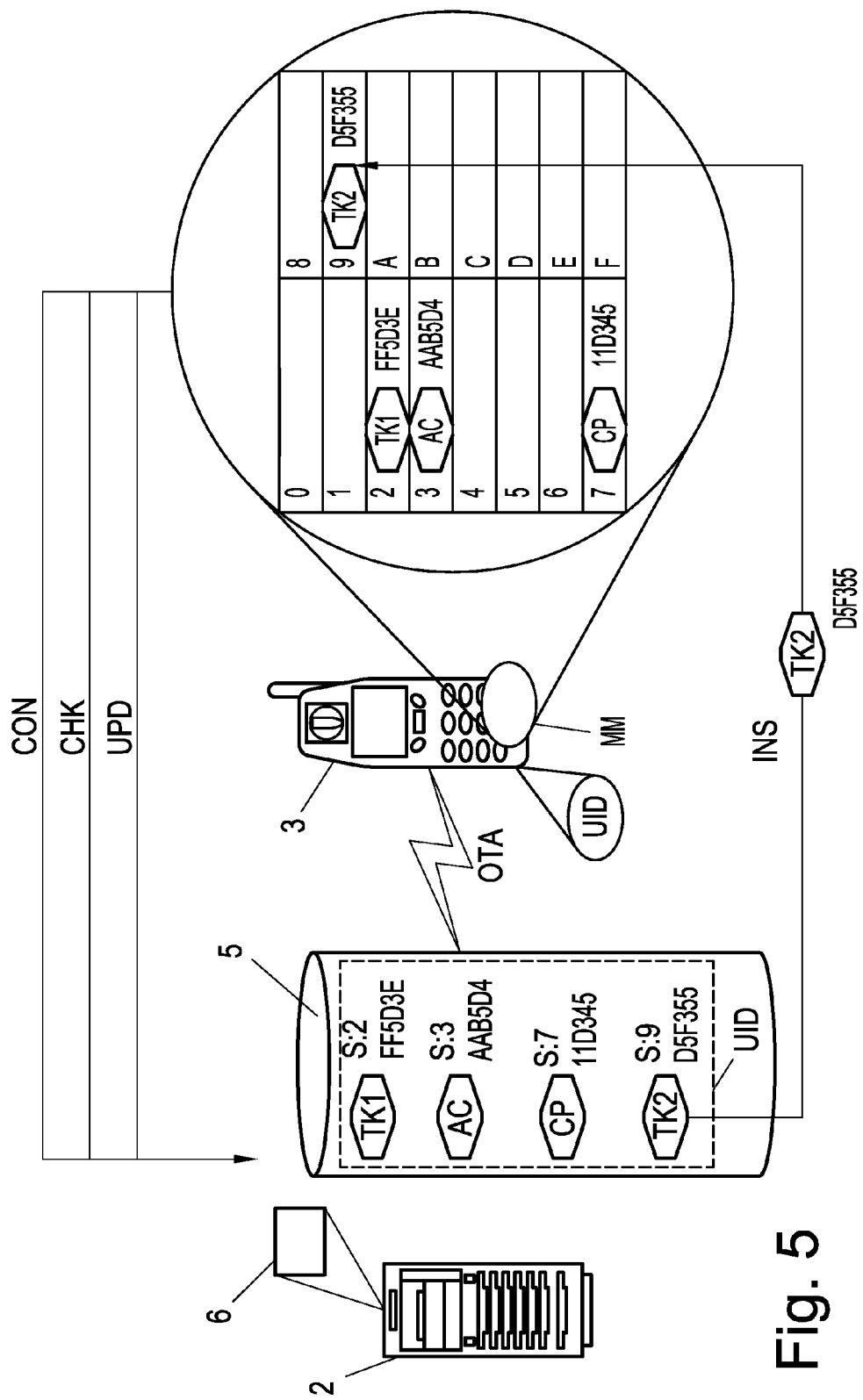
FIG. 5 shows the installation process of MIFARE applications in the context of the telecommunication system of FIG. 4.

Now the installation process of MIFARE application TK2 is explained with reference to FIG. 5. In a first step of the installation process the mobile communication device 3 connects (arrow CON) to the trusted service manager 2 via the Over-The-Air service OTA. During this connection establishing process the user identification UID is transmitted to the trusted service manager 2. When the connection has been established, the mobile communication device 3 asks (arrow CHK) the trusted service manager 2 whether there are any new MIFARE applications or updates available for it. In this example the MIFARE application TK2 is available, so the trusted service manager 2 answers with "YES". Next, the mobile communication device 3 sends an update request UPD to the trusted service manager 2. The trusted service manager 2 processes this update request UPD by retrieving the MIFARE application TK2 together with its assigned sector number S (here sector 9) and key K and transferring them altogether to the mobile communication device 3 via the Over-The-Air service OTA. The MIFARE application manager MAM within the mobile communication device 3 writes the MIFARE application TK2 in the specified sector no. 9 of the MIFARE memory MM and sets the key of this sector to that value, i.e. D5F355, which had been assigned to this MIFARE application TK2 by the trusted service manager.

Figure 6:
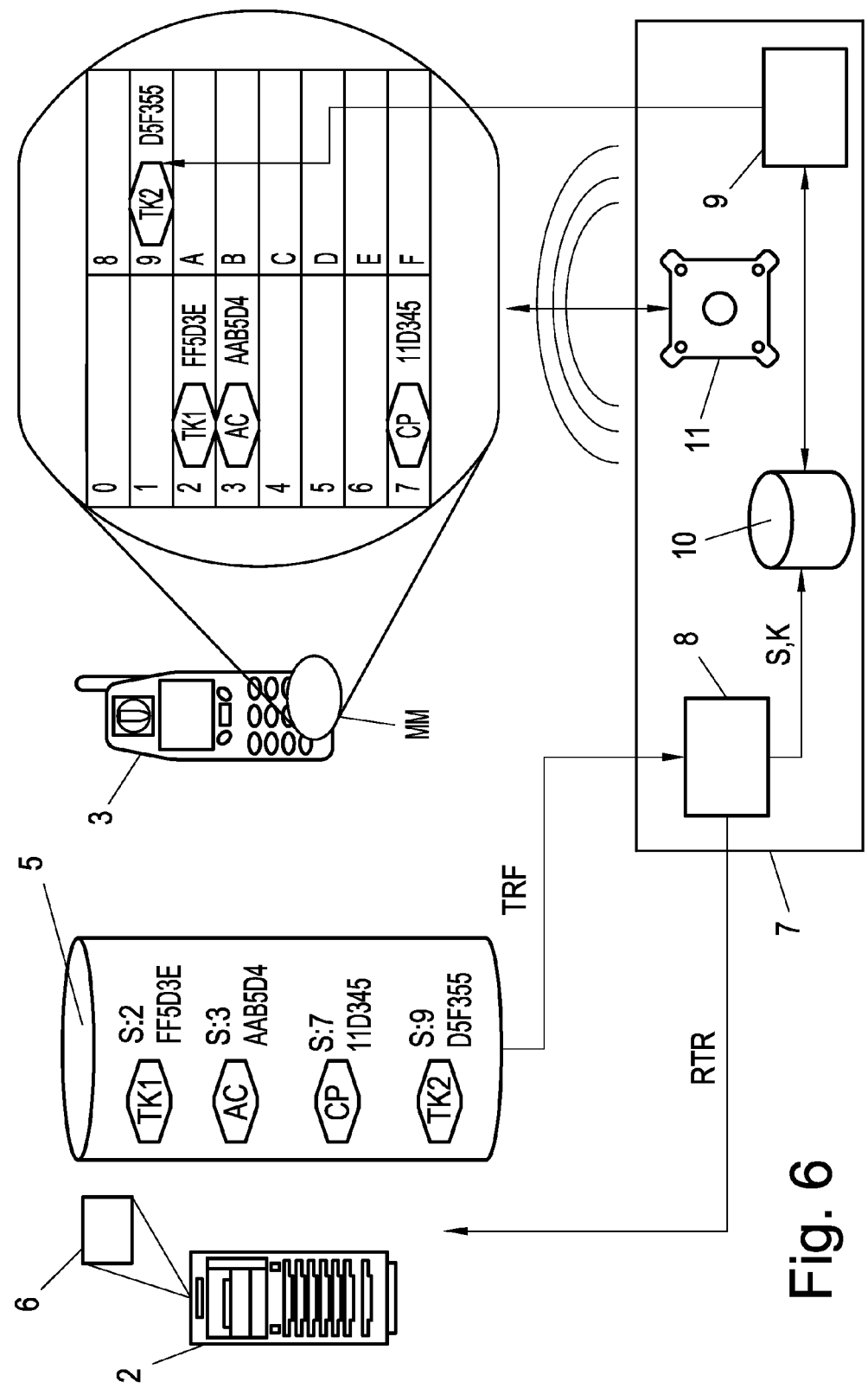
FIG. 6 shows a reading procedure for retrieving MIFARE applications from the MIFARE memory MM of mobile communication devices in the context of the telecommunication system of FIG. 4.

FIG. 6 is a schematic view explaining a reading procedure for retrieving the MIFARE application TK2 from the MIFARE memory MM of the mobile communication device 3.

An RFID reader 7 is provided that is adapted to establish a communication channel with the trusted service manager 2. This communication channel is for instance configured as a computer network connection like an Internet connection. The RFID reader 7 is time triggered, event triggered, or receives instructions from a service provider (via another communication channel) to establish said communication channel to the trusted service manager 2 in order to retrieve (arrow RTR) the sector S and key K for a particular MIFARE application, in this example the ticket MIFARE application TK2. For instance, for a concert of a rock band, the RFID reader 7, strictly speaking a sector and key finder application 8 within the RFID reader 7, retrieves 24 hours before this concert the sector S and key K of the ticket MIFARE application TK2 for this specific event.

The trusted service manager 2 replies to this retrieval request RTR in that it transfers (arrow TRF) the sector S and key K of the retrieved MIFARE application TK2. Preferably, the trusted service manager 2 offers enhanced security by transferring the requested sector S and key K of the retrieved MIFARE application TK2 only if it receives the retrieval RTR within a defined time frame, e.g. within 24 hours before the concert begins. Sector S and key K of the retrieved MIFARE application TK2 are stored in a memory 10 of the RFID reader 7.

It should be noticed that sectors and keys for specific MIFARE applications can be retrieved at any time by following the rules defined between the trusted service manager 2 and the sector and key finder application 8 of the RFID reader 7. It should further be noticed that the sector S and key K retrieved from the trusted service manager 2 are not linked to any user identification UID of any user's mobile communication device 3, but are valid for all ticket MIFARE applications TK2 related to a specific event (could e.g. be a concert or museum gate and so on). This means that for all mobile communication devices 3 that get into the data receiving range of the RFID reader 7, the RFID reader 7 will check the same sector S of a MIFARE memory MM of the mobile communication device 3 with the same key K, but will not carry out parsing of the whole content of the MIFARE memory MM. Therefore, the access to the specific MIFARE application TK2 is the fastest possible, since the access is immediately directed to the correct sector.

When the RFID reader 7 detects a mobile communication device 3 within the receiving range of its antenna 11 a MIFARE application reader module 9 of the RFID reader 7 fetches the sector S (in this example having a value 9) and the key K (in this example having the value D5F355) from the memory 10 and starts reading the sector 9 of the MIFARE memory MM of the mobile communication device 3 with the correct key K. It should be noticed that reading the MIFARE application TK1 may occur at any time after the sector S and the key K have been stored in the memory 10. Further, reading the specified sector S of the MIFARE memory MM with the specified key K may occur multiple times (e.g. for several mobiles communication devices 3).

Except from the specified sector S the RFID reader 7 has no access to other sectors of the MIFARE memory MM, simply since it doesn't have the keys. Thereby, user's privacy is respected. The RFID reader 7 accesses the specified sector S directly, allowing fastest possible access.

The main focus market for the present invention is the OTA (Over the Air) provisioning of new services like ticketing, transit, access control and so on. Especially when speed of access is very important (less than 150 ms for transit, less than 300 ms for stadium entrance) or when security and privacy is critical.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for providing fast and secure access to applications installed in a memory of a contactless smart card integrated circuit having read/write capability, the memory being divided into a plurality of sectors, each sector comprising a plurality of blocks, the sectors including a first sector for storing a user identification and further sectors, each of the further sectors being arranged to store one of the applications in a number of its blocks as well as an access key for the application in another of its blocks, wherein the method comprises:

keeping a repository of memory allocations to respective smart card memories and user identifications assigned to the respective memories, the allocations including applications installed in the respective memories, wherein, when a new application is installed in a one of the respective memories identified by a user identification UID, the present memory allocation of the memory is retrieved from the repository, an empty sector of the memory is calculated to create an assigned sector number, an access key is calculated for the application and the application together with the assigned sector number and the access key are linked to the user identification UID and are stored in the repository;

wherein, when a mobile communication device being equipped with the contactless smart card integrated circuit interrogates whether applications are available for a specified user identification, the applications assigned to the specific user identification are retrieved from the repository together with the assigned sector numbers and keys and are transferred to the mobile communication device via an Over-The-Air service; and wherein the mobile communication device installs the received applications in the sectors of the memory of the contactless smart card integrated circuit as prescribed by the sector numbers and writes the associated access keys into the memory.

2. The method as claimed in claim 1, wherein, when an RFID reader requests to get the sector and key for a particular application, the requested information is retrieved from the repository and transmitted to the RFID reader.

3. The method as claimed in claim 2, wherein, when an RFID reader requests to get the sector and key for a particular application, the requested information is retrieved from the repository and transmitted to the RFID reader only if the request is made within a defined time frame.

4. The method of claim 1, wherein the smart card is an emulated smart card.

5. A trusted service manager for a telecommunications system including a service provider and a mobile communication device comprising a contactless smart card integrated circuit memory having read/write capability, the memory being divided into a plurality of sectors, each sector comprising a plurality of blocks, the sectors including a first sector for storing a user identification UID and further sectors, each of the further sectors being arranged to store an application in a number of its blocks as well as an access key for the application in another of its blocks, the trusted service manager being adapted to:

communicate with the service provider via a computer network;

communicate with the mobile communication device via an over-the-air service of a mobile network operator; and keep a repository of allocations of the memories of respective mobile communication devices and the user identifications UID assigned to the memories, the respective allocations comprising all applications installed in the respective memories, wherein, when a new application is installed in a memory identified by the user identification UID, the trusted service manager is adapted to:

retrieve the present memory allocation of the memory from the repository;

calculate an empty sector of the memory to create an assigned sector number;

calculate an access key for the application;

link the application together with the assigned sector number and key to the user identification UID; and store them in the repository;

wherein the trusted service manager is adapted to receive from the mobile communication devices queries whether applications are available in respect of a specified user identification UID and to process said queries by retrieving from the repository the applications assigned to the user identification UID together with the assigned sector numbers and keys and transferring them to the mobile communication device via the Over-The-Air service for storage in the memory of the contactless smart card integrated circuit.

6. The trusted service manager as claimed in claim 5, wherein the trusted service manager is adapted to receive from the service provider an application to be installed in one of the memories and an assigned user identification UID identifying the memory.

7. The trusted service manager as claimed in claim 5, being adapted to receive from an RFID reader requests to get the sector and key for a particular application, to retrieve the requested information from the repository and to transmit the requested information to the RFID reader.

8. The trusted service manager as claimed in claim 7, being adapted to deny requests of an RFID reader to get the sector and key for a particular application except when the requests are received within a defined time frame.

* * * * *